United States Patent
Eckel et al.

(10) Patent No.: US 6,914,089 B2
(45) Date of Patent: Jul. 5, 2005

(54) FLAME-RESISTANT POLYCARBONATE BLENDS

(75) Inventors: Thomas Eckel, Dormagen (DE); Andreas Seidel, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 318 days.

(21) Appl. No.: 10/006,514

(22) Filed: Dec. 3, 2001

(65) Prior Publication Data

US 2002/0115759 A1 Aug. 22, 2002

(30) Foreign Application Priority Data

Dec. 8, 2000 (DE) .......................................... 100 61 081

(51) Int. Cl.⁷ ............................. C08K 5/49; C08K 5/51; C08K 5/53
(52) U.S. Cl. ........................ 524/115; 524/117; 524/123; 524/124; 524/139; 524/200
(58) Field of Search ................................ 524/115, 117, 524/123, 124, 139, 200

(56) References Cited

U.S. PATENT DOCUMENTS

| | | | | |
|---|---|---|---|---|
| 4,532,290 A | * | 7/1985 | Jaquiss et al. | 524/417 |
| 5,061,745 A | | 10/1991 | Wittmann et al. | 524/139 |
| 5,204,394 A | | 4/1993 | Gosens et al. | 524/125 |
| 5,672,645 A | | 9/1997 | Eckel et al. | 524/127 |
| RE36,188 E | | 4/1999 | Gosens et al. | 524/125 |
| RE36,902 E | | 10/2000 | Eckel et al. | 524/127 |

FOREIGN PATENT DOCUMENTS

| | | |
|---|---|---|
| DE | 198 01 198 A1 | 7/1999 |
| DE | 198 28 563 | 12/1999 |
| WO | 01/18117 A1 | 3/2001 |

* cited by examiner

Primary Examiner—Kriellion A. Sanders
(74) Attorney, Agent, or Firm—Joseph C. Gil; Aron Preis

(57) ABSTRACT

A thermoplastic molding composition suitable for producing article having excellent flame proofing and improved stress cracking resistance is disclosed. The composition contains an aromatic polycarbonate and/or polyester carbonate, a toughening agent, an optional thermoplastic (co)polymer and a combination of phosphorus compounds.

21 Claims, No Drawings

FLAME-RESISTANT POLYCARBONATE BLENDS

FIELD OF THE INVENTION

The present invention relates to toughened polycarbonate blends that incorporate a combination of organic phosphorus compounds and inorganic phosphorus/oxygen compounds or phosphorus/sulfur compounds that have an excellent flame proofing and improved stress cracking behaviour (towards media such as solvents or greases).

BACKGROUND OF THE INVENTION

EP-A 0 640 655 describes moulding compositions composed of aromatic polycarbonate, styrene-containing copolymers and graft polymers that can be rendered flame-resistant with monomeric and/or oligomeric organic phosphorus compounds.

EP-A 0 363 608 describes flame-resistant polymer blends composed of aromatic polycarbonate, styrene-containing copolymer or graft copolymer and oligomeric organic phosphates as flame retardants.

U.S. Pat. No. 5,061,745 describes polymer blends composed of aromatic polycarbonate, ABS graft polymer and/or styrene-containing copolymer and organic monophosphates as flame retardants.

A combination of organic phosphorus compounds and inorganic phosphorus/oxygen compounds or phosphorus/sulfur compounds is not described therein. Common to all the applications cited is that, to achieve an excellent flame-proofing with very short burning times, very large amounts of phosphates have to be used and these have an adverse effect on the stress cracking behaviour of the respective moulding compositions.

The demand for a property combination comprising outstanding flame resistance and very good stress cracking behaviour complies, in particular, with the demand for increasingly thinner moulded-part wall thicknesses.

DETAILED DESCRIPTION OF THE INVENTION

The object of the present invention is to provide polycarbonate compositions having an improved flame resistance and improved stress cracking behaviour in contact with media such as, for example, greases, oils or solvents. This spectrum of properties is demanded, in particular, in applications in the field of data technology, such as, for instance, for housings of monitors, printers, copiers, notebooks etc.

It has now been found that polycarbonate compositions that contain a combination of organic phosphorus compounds and inorganic phosphorus/oxygen compounds as flame retardants have the desired properties.

The invention therefore relates to thermoplastic molding compositions containing
A) aromatic polycarbonate and/or polyester carbonate,
B) impact modifier,
C) optionally, thermoplastic homopolymer and/or copolymer,
D) a combination of
 D.1 phosphorus compound and
 D.2 phosphorus/oxygen compound different from D.1 or phosphorus/sulfur compound or the reaction product of D.1 and D.2.
Component D is preferably present in an amount of 0.1 to 30 parts by weight (relative to the entire composition). Preferably, component D.2 contains a phosphorous/oxygen compound.

The invention preferably relates to blends containing
A) 40 to 99, preferably 60 to 98.5 parts by weight of aromatic polycarbonate and/or polyester carbonate,
B) 0.5 to 60, preferably 1 to 40, in particular 2 to 25 parts by weight of a graft polymer of
 B.1) 5 to 95, preferably 30 to 80 wt % of one or more vinyl monomers on
 B.2) 95 to 5, preferably 20 to 70 wt % of one or more graft bases having a glass-transition temperature of <10° C., preferably <0° C., particularly preferably <−20° C.,
C) 0 to 45, preferably 0 to 30, particularly preferably 2 to 25 parts by weight of at least one thermoplastic polymer selected from the group consisting of vinyl (co)polymers and polyalkylene terephthalates,
D) 0.1 to 30 parts by weight, preferably 1 to 25 parts by weight, particularly preferably 2 to 20 parts by weight of a combination of
 D.1) organic phosphorus compound and
 D.2) a phosphorus/oxygen compound or phosphorus/sulfur compound and also
E) 0 to 5, preferably 0.1 to 3, particularly preferably 0.1 to 1 part by weight, in particular 0.1 to 0.5 parts by weight of fluorinated polyolefin,
wherein the sum of the parts by weight of the components A–E is 100.

Component A

According to the invention, suitable aromatic polycarbonates and/or aromatic polyester carbonates in accordance with component A are known in the literature and can be prepared by methods known in the literature (for the preparation of aromatic carbonates, see, for example, Schnell, "Chemistry and Physics of Polycarbonates", Interscience Publishers, 1964 and also DE-A 1 495 626, DE-A 2 232 877, DE-A 2 703 376, DE-A 2 714 544, DE-A 3 000 610, DE-A 3 832 396; for the preparation of aromatic polyester carbonates see, for example, DE-A 3 077 934).

Aromatic polycarbonates are prepared, for example, by reacting diphenols with carbonyl halides, preferably phosgene, and/or with aromatic dicarboxylic dihalides, preferably benzenedicarboxylic dihalides, by the phase boundary surface method, optionally using chain terminators, for example monophenols, and optionally using trifunctional or more than trifunctional branching agents, for example triphenols or tetraphenols.

Diphenols for preparing the aromatic polycarbonates and/or aromatic polyester carbonates are preferably those of the formula (I)

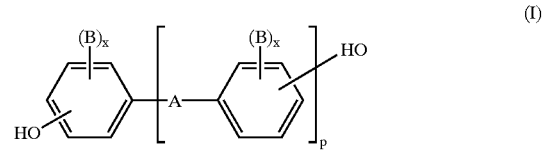

(I)

where

A is a single bond, $C_1$–$C_5$-alkylene, $C_2$–$C_5$-alkylidene, $C_5$–$C_6$-cycloalkylidene, —O—, —SO—, —CO—, —S—, —$SO_2$—, $C_6$–$C_{12}$-arylene onto which further aromatic rings, optionally containing heteroatoms may be condensed, or a radical of the formula (IIa) or (IIb)

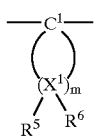

(IIa)

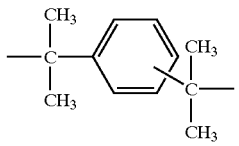

(IIb)

where

B is, in each case, $C_1$–$C_{12}$-alkyl, preferably methyl, halogen, preferably chlorine and/or bromine, x is, in each case, independently of one another 0,1 or 2, p is 1 or 0 and $R^7$ and $R^8$ are, individually selectable for every $X^1$ and independently of one another, hydrogen or $C_1$–$C_6$-alkyl, preferably hydrogen, methyl or ethyl, $X^1$ is carbon and m is an integer from 4 to 7, preferably 4 or 5, with the proviso that, at least at one atom $X^1$, $R^7$ and $R^8$ are simultaneously alkyl.

Preferred diphenols are hydroquinone, resorcinol, dihydroxydiphenols, bis(hydroxyphenyl)-$C_1$–$C_5$-alkanes, bis(hydroxyphenyl)-$C_5$–$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also their nucleus-brominated and/or nucleus-chlorinated derivatives.

Particularly preferred diphenols are 4,4'-dihydroxydiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenylsulfone and also their di- and tetrabrominated or chlorinated derivatives, such as, for example, 2,2-bis(3-chloro-4-hydroxyphenyl)propane, 2,2-bis(3,5-dichloro-4-hydroxyphenyl)propane or 2,2-bis(3,5-dibromo-4-hydroxyphenyl) propane.

Preferred, in particular, is 2,2-bis(4-hydroxyphenyl) propane (bisphenol A).

Diphenols may be used individually or as any desired mixtures.

The diphenols are known in the literature or are obtainable by methods known in the literature.

Suitable for the preparation of thermoplastic aromatic polycarbonates are chain terminators, for example, phenol, p-chlorophenol, p-tert-butyl-phenol or 2,4,6-tribromophenol and also long-chain alkylphenols, such as 4-(1,3-tetramethylbutyl)phenol in accordance with DE-A 2 842 005 or monoalkylphenols or dialkylphenols having in total 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators used is in general between 0.5 mol % and 10 mol %, relative to the molar sum of the diphenols used in each case.

The thermoplastic aromatic polycarbonates have mean weight-average molecular weights ($M_w$ as measured, for example, by ultra-centrifuging or light scattering) of 10,000 to 200,000, preferably 20,000 to 80,000.

The thermoplastic aromatic polycarbonates can be branched in a known manner and, specifically, preferably by the incorporation of 0.05 to 2.0 mol %, relative to the sum of the diphenols used, of trifunctional or more than trifunctional compounds, for example those containing three phenolic groups and over.

Both homopolycarbonates and copolycarbonates are suitable. To prepare copolycarbonates according to the invention in accordance with component A, 1 to 25 wt %, preferably 2.5 to 25 wt % (relative to the total amount of diphenols used) of polydiorganosiloxanes containing hydroxyaryloxy terminal groups may also be used. These are known (see, for example, U.S. Pat. No. 3,419,634) or can be prepared by methods known in the literature. The preparation of polydiorganosiloxane-containing copolycarbonates is described, for example, in DE-A 3 334 782.

In addition to the bisphenol A homopolycarbonates, preferred polycarbonates are the copolycarbonates of bisphenol A containing up to 15 mol %, relative to the molar sum of diphenols, of other diphenols named as preferred or particularly preferred, in particular 2,2-bis(3,5-dibromo-4-hydroxyphenyl)propane.

Aromatic dicarboxylic dihalides for preparing aromatic polyester carbonates are preferably the diacid dichlorides of isophthalic acid, terephthalic acid, diphenyl ether 4,4'-dicarboxylic acid and of naphthalene-2,6-dicarboxylic acid.

Particularly preferred are mixtures of the diacid dichlorides of isophthalic acid and of terephthalic acid in a ratio of between 1:20 and 20:1.

A carbonyl halide, preferably phosgene, is concomitantly used as a bifunctional acid derivative in addition in the preparation of polyester carbonates.

In addition to the monophenols already mentioned, their chloroformates and also the acid chlorides of aromatic monocarboxylic acids, which may optionally be substituted by $C_1$–$C_{22}$-alkyl groups or by halogen atoms, and also aliphatic $C_2$–$C_{22}$-monocarboxylic chlorides are suitable as chain terminators for the preparation of aromatic polyester carbonates.

The amount of chain terminators is, in each case, 0.1 to 10 mol %, relative in the case of the phenolic chain terminators to moles of diphenols and in the case of monocarboxylic chloride chain terminators to moles of dicarboxylic dichlorides.

The aromatic polyester carbonates may also incorporate aromatic hydroxycarboxylic acid.

The aromatic polyester carbonates may be linear or branched in a known manner (in this connection, see also DE-A 2 940 024 and DE-A 3 007 934).

As branching agents, use may be made, for example, of three-functional or multifunctional carboxylic chlorides, such as trimesic trichloride, cyanuric trichloride, 3,3',4,4'-benzophenonetetracarboxylic-tetrachloride, 1,4,5,8-napthalinetetracarboxylictetrachloride or pyromellitictetrachloride, in amounts of 0.01 to 1.0 mol % (relative to the dicarboxylicdichloride used), or three-functional or multifunctional phenols, such as phloroglucinol, 4,6-dimethyl-2,4,6-tri(4-hydroxyphenyl) heptene-2,4,4-dimethyl-2,4-6-tri(4-hydroxyphenyl)heptane, 1,3,5-tri(4-hydroxy-phenyl)benzene, 1,1,1-tri(4-hydroxyphenyl)ethane, tri(4-hydroxy-phenyl) phenylmethane, 2,2-bis[4,4-bis(4-hydroxy-phenyl)-cyclohexyl]propane, 2,4-bis(4-hydroxyphenyl-isopropyl) phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy) methane, 1,4-bis[(4,4'-dihydroxytriphenyl) methyl]benzene, in amounts of 0.01 to 1.0 mol %, relative to the diphenols used. Phenolic branching agents may be introduced with the diphenols, while acid chloride branching agents may be fed in together with the acid dichlorides.

In the thermoplastic aromatic polyester carbonates, the proportion of carbonate structural units may be varied as desired. Preferably, the proportion of carbonate groups is up to 100 mol %, in particular up to 80 mol %, particularly preferably up to 50 mol %, relative to the sum of ester groups and carbonate groups. Both the ester component and the carbonate component of the aromatic polyester carbonates may be present in the form of blocks or randomly distributed in the polycondensate.

The relative solution viscosity ($\eta_{rel}$) of the aromatic polycarbonates and polyester carbonates is in the range from 1.18 to 1.4, preferably 1.22 to 1.3 (measured on solutions of 0.5 polycarbonate or polyester carbonate in 100 ml of methylene chloride solution at 25° C.).

The thermoplastic, aromatic polycarbonates and polyester carbonates can be used alone or in any desired mixture with one another.

Component B

The component B comprises one or more graft polymers of

B.1 5 to 95, preferably 30 to 80 wt % of at least one vinyl monomer on

B.2 95 to 5, preferably 70 to 20 wt % of one or more graft bases having glass-transition temperatures of <10° C., preferably<0° C., particularly preferably <−20° C.

The graft base B.2 has in general a mean particle size ($d_{50}$ value) of 0.05 to 5 µm, preferably 0.10 to 0.5 µm, particularly preferably 0.20 to 0.40 µm.

B.1 is preferably a mixture of

B.1.1 50 to 99 parts by weight of vinyl aromatics and/or nucleus-substituted vinyl aromatics (such as, for example, styrene, α-methylstyrene, p-methylstyrene, p-chlorostyrene) and/or $C_1$–$C_4$-alkyl methacrylates (such as, for example, methyl methacrylate, ethyl methacrylate) and B.1.2 1 to 50 parts by weight of vinyl cyanides (unsaturated nitriles, such as acrylonitrile and methacrylonitrile) and/or $C_1$–$C_8$-alkyl (meth)acrylates (such as, for example, methyl methacrylate, n-butyl acrylate, tert-butyl acrylate) and/or derivatives (such as anhydrides or imides) of unsaturated carboxylic acids (for example, maleic anhydride and N-phenylmaleimide).

Preferred monomers B.1.1 are at least one of the monomers styrene, α-methylstyrene and methyl methacrylate and, preferably, monomers B.1.2 are at least one of the monomers acrylonitrile, maleic anhydride and methyl methacrylate.

Particularly preferred monomers are B.1.1 styrene and B.1.2 acrylonitrile.

Suitable graft bases B2 for the graft polymers B are, for example, diene rubbers, EP(D)M rubbers, that is to say those based on ethylene/propylene or ethylene/propylene/diene; furthermore acrylate rubbers, polyurethane rubbers, silicone rubbers, chloroprene rubbers and ethylene/vinyl acetate rubbers.

Preferred graft bases B.2 are diene rubbers (for example, based on butadiene, isoprene, etc.) or mixtures of diene rubbers or copolymers of diene rubbers or their mixtures with further copolymerizable monomers (for example, in accordance with B.1.1 and B.1.2), with the proviso that the glass-transition temperature of the component B.2 is <10° C., preferably <0° C., particularly preferably <−10° C.

Particularly preferred is pure polybutadiene rubber.

Particularly preferred polymers B are, for example, ABS polymers (emulsion, bulk and suspension ABS), such as are described, for example, in DE-A 2 035 390 (=U.S. Pat. No. 3,644,574) or in DE-A 2 248 242 (=GB-A 1 409 275) or in the Ullmann Encyclopaedia of Industrial Chemistry, Vol. 19 (1980), pages 280 ff. The gel component of the graft base B.2 is at least 30 wt %, preferably at least 40 wt % (measured in toluene).

The graft copolymers B may be prepared by free-radical polymerization, for example by emulsion, suspension, solution or bulk polymerization, preferably by emulsion polymerization.

Particularly suitable graft rubbers are also ABS polymers that are produced by redox initiation using an initiator system composed of organic hydroperoxide and ascorbic acid in accordance with U.S. Pat. No. 4,937,285.

Since the graft monomers are known not necessarily to be grafted completely onto the graft base during the graft reaction, graft polymers B are understood as meaning, according to the invention, only those products that are obtained by graft polymerization of the graft monomers in the presence of the graft base.

(See the note above relative to the inconsistency) Suitable acrylate rubbers according to B.2 of the polymers B are preferably polymers of alkyl acrylates, optionally with up to 40 wt %, relative to the weight of B, of other ethylenically unsaturated monomers that can be polymerized onto B.2. The preferred polymerizable acrylates include $C_1$–$C_8$-alkylesters, for example methyl, ethyl, butyl, n-octyl and 2-ethylhexyl ester; haloalkyl esters, preferably halo-$C_1$–$C_8$-alkyl esters, such as chloroethyl acrylate, and also mixtures of said monomers.

For the purpose of crosslinking, monomers containing more than one polymerizable double bond may be copolymerized. Preferred examples of crosslinking monomers are esters of unsaturated monocarboxylic acids containing 3 to 8 carbon atoms and unsaturated monohydric alcohols containing 3 to 12 carbon atoms, or saturated polyols containing 2 to 4 OH groups and 2 to 20 carbon atoms, such as, for example, ethylene glycol dimethacrylate, allyl methacrylate; polyunsaturated heterocyclic compounds, such as, for example, trivinyl cyanurate and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers trialkyl cyanurate, triallyl isocyanurate, triacryloylhexahydro-s-triazine and triallylbenzenes. The amount of the crosslinked monomers is preferably 0.02 to 5, in particular 0.05 to 2 wt %, relative to the graft base B.2.

In the case of cyclic crosslinking monomers containing less than three ethylenically unsaturated groups, it is advantageous to restrict the amount to below 1 wt % of the graft base B.2.

Preferred "other" polymerizable, ethylenically unsaturated monomers that may optionally serve to prepare graft base B.2 in addition to acrylates are, for example, acrylonitrile, styrene, α-methylstyrene, acrylamides, vinyl-$C_1$–$C_6$-alkyl ethers, methylmethacrylate and butadiene. Preferred acrylate rubbers as graft base B.2 are emulsion polymers having a gel content of at least 60 wt %.

Further suitable graft bases in accordance with B.2 are silicone rubbers containing active graft positions, such as those described in DE-A 3 704 657, DE-A 3 704 655, DE-A 3 631 540 and DE-A 3 631 539.

The gel content of the graft base B.2 is determined at 25° C. in a suitable solvent (M. Hoffmann, H. Krömer, R. Kuhn, Polymeranalytik I und II (Polymer analysis I and II), Georg Thieme-Verlag, Stuttgart, 1977).

The mean particle size $d_{50}$ is the diameter above and below which 50 wt % of the particles are in each case. It can be determined by means of ultracentrifuging measurements (W. Scholtan, H. Lange, Kolloid, Z. and Z. Polymere, 250 (1972), 782-1796).

Component C

The component C comprises one or more thermoplastic vinyl (co)polymers C.1 and/or polyalkylene terephthalates C.2.

Suitable as vinyl (co)polymers C.1 are polymers of at least one monomer from the group comprising the vinyl aromatics, vinyl cyanides (unsaturated nitriles), $C_1$–$C_8$-alkyl (meth)acrylates, unsaturated carboxylic acids and also derivatives (such as anhydrides and imides) of unsaturated carboxylic acids. Suitable, in particular, are (co)polymers of C.1.1 50 to 99, preferably 60 to 80 parts by weight of vinyl aromatics and/or nucleus-substituted vinyl aromatics (such as, for example, styrene, α-methylstyrene, p-methylstyrene, p-chlorostyrene) and/or $C_1$–$C_8$-alkyl methacrylates (such as, for example, methyl methacrylate, ethyl methacrylate, and C.1.2 1 to 50, preferably 20 to 40 parts by weight of vinyl cyanides (unsaturated nitriles) such as acrylonitrile and methacrylonitrile and/or $C_1$–$C_8$-alkyl (meth)acrylates (such as, for example, methyl methacrylate, n-butyl acrylate, tert-butyl acrylate) and/or unsaturated carboxylic acids such as maleic acid) and/or derivatives (such as anhydrides and imides) of unsaturated carboxylic acids (for example, maleic anhydride and N-phenylmaleimide).

(Co)polymers C.1 are resinous, thermoplastic and rubber-free. Particularly preferred is the copolymer of C.1.1 styrene and C.1.2 acrylonitrile.

The (co)polymers in accordance with C.1 are known and can be prepared by free-radical polymerization, in particular by emulsion, suspension, solution or bulk polymerization. The (co)polymers preferably have molecular weights $\overline{M}_w$ (average weight determined by light scattering or sedimentation) of between 15,000 and 200,000.

The polyalkylene terephthalates of the component C.2 are reaction products of aromatic dicarboxylic acid or their reactive derivatives, such as dimethyl esters or anhydrides, and aliphatic, cycloaliphatic or araliphatic diols and also mixtures of said reaction products.

Preferred polyalkylene terephthalates contain at least 80 wt %, preferably at least 90 wt %, relative to the dicarboxylic acid component, of terephthalic acid radicals and at least 80 wt %, preferably at least 90 mol %, relative to the diol component, of ethylene glycol and/or butane diol 1,4- radicals.

The preferred polyalkylene terephthalates may contain, in addition to terephthalate radicals, up to 20 mol %, preferably up to 10 mol %, of radicals of other aromatic or cycloaromatic dicarboxylic acids containing 8 to 14 carbon atoms or aliphatic dicarboxylic acids containing 4 to 12 carbon atoms, such as, for example, phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid radicals.

The preferred polyalkylene terephthalates may contain, in addition to ethylene glycol or butanediol 1,4-radicals, up to 20 mol %, preferably up to 10 mol % of other aliphatic diols containing 3 to 12 carbon atoms or cycloaliphatic diols containing 6 to 21 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethyl cyclobutane, 2,2-bis(4-β-hydroxy-phenyl) propane and 2,2-bis(4-hydroxypropoxyphenyl)propane (DE-OS 2 407 674, 2 407 776, 2 715 932).

The polyalkylene terephthalates may be branched by incorporating relatively small amounts of trihydric or tetrahydric alcohols or tribasic or tetrabasic carboxylic acids, for example in accordance with DE-A 1 900 270 and U.S. Pat. No. 3,692,744. Examples of preferred branching agents are trimesic acid, trimellitic acid, trimethylolmethane and trimethylolpropane and pentaerythritol.

Particularly preferred are polyalkylene terephthalates that have been prepared solely from terephthalic acid and its reactive derivatives (for example, its dialkylesters) and ethylene glycol and/or 1,4-butanediol and blends of said polyalkylene terephthalates.

Blends of polyalkylene terephthalates contain 1 to 50 wt %, preferably 1 to 30 wt % of polyethylene terephthalate and 50 to 99 wt %, preferably 70 to 99 wt % of polybutylene terephthalate.

The polyalkylene terephthalates preferably used have, in general, an intrinsic viscosity of 0.4 to 1.5 dl/g, preferably 0.5 to 1.2 dl/g, measured in phenol/o-dichlorobenzene (1:1 parts by weight) at 25° C. in the Ubbelohde viscometer.

The polyalkylene terephthalates can be produced by known methods (see, for example, Kunststoff-Handbuch (Plastics Manual), Volume VIII, pages 695 ff., Carl-Hanser-Verlag, Munich, 1973).

Component D

D.1 in component D is preferably present in amounts of 50–98 wt.-%, particularly preferred in amounts of 70 to 98 wt. % and in particular in amounts of 75 to 95 wt. % and D.2 preferably in amounts of 50 to 2 wt.-%, particularly preferred in amount of 30 to 2 wt. % and in particular in amounts of 25 to 5 wt. % relative to the weight of D.

Phosphorous-containing flame retardants in accordance with component D.1 are preferably selected from among the monomeric and oligomeric phosphoric and phosphonic acid esters, phosphonate amines and phosphazenes, it also being possible to use mixtures of several components selected from one or several of these groups as flame retardants. Other halogen-free phosphorus compounds not specially mentioned here may be used alone or in any desired combination with other halogen-free phosphorus compounds.

Preferred monomeric and oligomeric phosphoric acid or phosphonic acid esters are phosphorus compounds of the general formula (III)

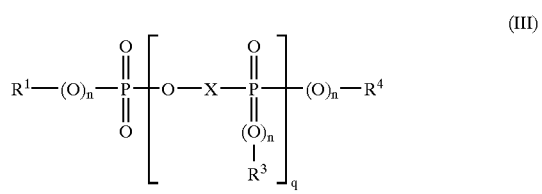

where

R$^1$, R$^2$, R$^3$ and R$^4$ are, independently of one another, in each case optionally halogenated $C_1$- to $C_8$-alkyl, optionally substituted in each case by alkyl, preferably $C_1$–$C_4$-alkyl, and/or halogen-substituted, preferably chlorine-substituted or bromine-substituted, $C_5$- to $C_6$-cycloalkyl, $C_6$- to $C_{20}$-aryl or $C_7$- to $C_{12}$-arylkyl, n is, independently of one another, 0 or 1, q is 0 to 30 and X is a mononuclear or polynuclear aromatic radical containing 6 to 30 carbon atoms or a linear or branched aliphatic radical containing 2 to 30 carbon atoms, which may be OH-substituted and contain up to 8 ether bonds.

Preferably, $R^1$, $R^2$, $R^3$ and $R^4$ stand, independently of one another, for $C_1$–$C_4$-alkyl, phenyl, naphthyl or phenyl-$C_1$–$C_4$-alkyl. The aromatic groups $R^1$, $R^2$, $R^3$ and $R^4$ may be substituted in turn by halogen and/or alkyl groups, preferably chlorine, bromine and/or $C_1$–$C_4$-alkyl. Particularly preferable aryl radicals are cresyl, phenyl, xyleneyl, propylphenyl or butylphenyl and also the corresponding brominated and chlorinated derivatives thereof.

X in formula (III) is preferably a mononuclear or polynuclear aromatic radical containing 6 to 30 carbon atoms. It is preferably derived from the diphenols of formula (I).

n in formula (III) may be, independently of one another, 0 or 1, but preferably n is equal to 1.

q stands for values from 0 to 30. If blends of various components of formula (III) are used, blends can be used that preferably have number-average q-values of 0.3 to 20, particularly preferably 0.5 to 10, in particular 0.5 to 6.

X stands, in particular for

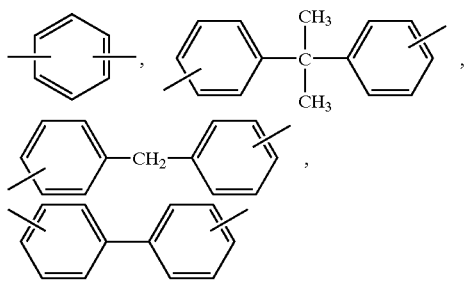

or their chlorinated or brominated derivatives and, in particular, X is derived from resorcinol, hydroquinone, bisphenol A or diphenylphenol. Particularly preferably, X is derived from bisphenol A.

The use of oligomeric phosphoric acid esters of formula (III) that are derived from bisphenol A is particularly advantageous since the compositions incorporating said phosphorus compound have a particularly high stress crack resistance and hydrolysis resistance and also a particularly low tendency to encrustation during the injection-moulding processing. Furthermore, a particularly high heat distortion resistance can be achieved with said flame retardants.

Monophosphates (q=0), oligophosphates (q=1–30) or mixtures of monophosphates and oligophosphates may be used as component D.1 in accordance with the invention.

Monophosphorus compounds of formula III are, in particular, tributyl phosphate, tris(2-chloroethyl) phosphate, tris(2,3-dibromopropyl) phosphate, triphenyl phosphate, tricresyl phosphate, diphenylcresyl phosphate, diphenyloctyl phosphate, diphenyl-2-ethylcresyl phosphate, tri(isopropylphenyl) phosphate, halogen-substituted arylphosphates, dimethyl methyl phosphonate, diphenyl methylphosphenate, diethyl phenylphosphonate, triphenylphosphene oxide or tricresylphosphene oxide.

The phosphorus compounds in accordance with component D.1 of formula (III) are known (cf. for example, EP-A 363 608, EP-A 640 655) or can be prepared by known methods in an analogous way (for example, Ullmanns Encyclopaedia of Industrial Chemistry, Vol. 18, pages 301 ff., 1979; Houben-Weyl, Methoden der organischen Chemie (Methods of Organic Chemistry), Vol. 12/1, page 43; Beilstein Vol. 6, page 177).

The mean q-values may be determined by determining the composition of the phosphate blend (molecular weight distribution) by means of suitable methods (gas chromatography (GC) High Pressure Liquid Chromatography (HPLC), Gel permeation chromatography (GPC)) and calculating the mean values of q therefrom.

Phosphonate amines are preferably compounds of formula (IV)

$$A_{3-y}\text{—}NB^1_y \tag{IV}$$

in which

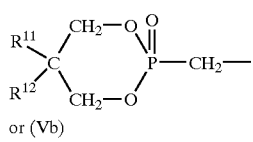

or (Vb)

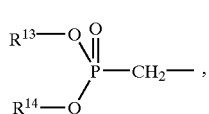

A stands for a radical of formula (Va)

$R^{11}$ and $R^{12}$ stand, independently of one another, for unsubstituted or substituted $C_1$–$C_{10}$-alkyl or for unsubstituted or substituted $C_6$–$C_{10}$-aryl, $R^{13}$ and $R^{14}$ stand, independently of one another, for unsubstituted or substituted $C_1$–$C_{10}$-alkyl or unsubstituted or substituted $C_6$–$C_{10}$-aryl or $R^{13}$ and $R^{14}$ may together form unsubstituted or substituted heterocyclic ring of 3 to 10 carbon atoms y is the numerical values 0, 1 or 2 and $B^1$ stands independently for hydrogen, optionally halogenated $C_2$–$C_8$-alkyl, unsubstituted or substituted $C_6$–$C_{10}$-aryl.

$B^1$ preferably stands independently for hydrogen, for ethyl, n-propyl or isopropyl, which may be substituted by halogen, unsubstituted or $C_6$–$C_{10}$-aryl, in particular phenyl or naphthyl, substituted by $C_1$–$C_4$-alkyl and/or halogen.

Alkyl in $R^{11}$, $R^{12}$, $R^{13}$ and $R^{14}$ stands independently preferably for methyl, ethyl, n-propyl, isopropyl, n-, iso-, sec- or tert-butyl, pentyl or hexyl.

Substituted alkyl in $R^{11}$, $R^{12}$, $R^{13}$ and $R^{14}$ stands independently preferably for halogen-substituted $C_1$–$C_{10}$ alkyl, in particular for a monosubstituted or disubstituted methyl, ethyl, n-propyl, isopropyl, n-, iso-, sec- or tert-butyl, pentyl or hexyl.

$C_6$–$C_{10}$-aryl in $R^{11}$, $R^{12}$, $R^{13}$ and $R^{14}$ stands independently preferably for phenyl, naphthyl or binaphthyl, in particular o-phenyl, o-naphthyl, o-binaphthyl, which may be halogen-substituted (in general mono-, di- or trisubstituted).

$R^{13}$ and $R^{14}$ may form a ring structure together with the oxygen atoms to which they are directly bound and the phosphorus atom.

By way of example and preferably, mention is made of: 5,5,5',5',5'',5''-hexamethyltris(1,3,2- dioxaphosphorinanemethane) amino-2,2',2"-trioxide of formula (Va-1)

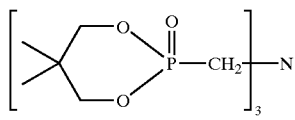

(Experimental product XPM 1000 produced by Solutia Inc., St Louis, USA), 1,3,2-dioxaphosphorinane-2-methaneamine, N-butyl-N-[(5,5-dimethyl-1,3,2-dioxa-2-phosphorinanyl)methyl]-5,5-dimethyl P,2-dioxides, 1,3,2-dioxaphosphorinane-2-methaneamine, N-[(5,5-dimethyl-1,3,2-dioxa-2-phosphorinanyl) methyl]-5,5-dimethyl-N-phenyl P,2-dioxide, 1,3,2-dioxaphosphorinane-2-methaneamine, N,N-dibutyl-5,5-dimethyl 2-oxide, 1,3,2-dioxaphosphorinane-2-methanimine, N-[(5,5-dimethyl-1,3,2-dioxa-2-phosphorinanyl) methyl]-N-ethyl-5,5-dimethyl P,2-dioxide, 1,3,2-dioxaphosphorinane-2-methaneamine, N-butyl-N-[(5,5-dichloromethyl-1,3,2-dioxa-2-phosphorinanyl)methyl]-5,5-dichloromethyl P,2-dioxide, 1,3,2-dioxaphosphorinane-2-methaneamine, N-[(5,5-dichloromethyl-1,3,2-dioxa-2-phosphorinanyl)methyl]-5,5-dichloromethyl-N-phenyl P,2-dioxide; 1,3,2-dioxa-2-phosphorinane methaneamine, N,N-di(4-chlorobutyl)-5,5-dimethyl 2-oxide, 1,3,2-dioxa-2-phosphorinanemethaneimine, N-[(5,5-dimethyl-1,3,2-dioxa-2-phosphorinanyl)methane]-N-(2-chloroethyl)-5,5-di(chloromethyl) P,2-dioxide.

Preferred are, furthermore:

Compounds of formulae (Va-2) or (Va-3)

where $R^{11}$, $R^{12}$, $R^{13}$ and $R^{14}$ have the meanings specified above.

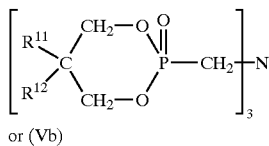

or (Vb)

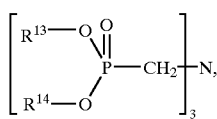

Particularly preferred are compounds of formulae (Va-2) and (Va-1).

The preparation of the phosphate amines is described, for example, in U.S. Pat. No. 5,844,028.

Phosphazenes are compounds of formulae (VIa) and (VIb)

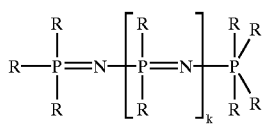

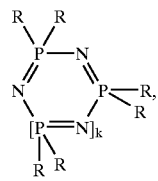

wherein

R is in each case identical or different and stands for amino, in each case optionally halogenated, preferably fluorine-halogenated $C_1$- to $C_8$-alkyl, or $C_1$- to $C_8$-alkoxy, in each case optionally substituted by alkyl, preferably $C_1$–$C_4$-alkyl, and/or halogen-substituted, preferably chlorine- and/or bromine-substituted, $C_5$–$C_6$-cycloalkyl, $C_6$- to $C_{20}$-aryl, preferably phenyl or naphthyl, $C_6$- to $C_{20}$-aryloxy, preferably phenoxy, naphthyloxy or $C_7$- to $C_{12}$-aralkyl, preferably phenyl-$C_1$–$C_4$-alkyl, k stands for 0 or a number from 1 to 15, preferably for a number from 1 to 10.

By way of example mention may be made of:

Propoxyphosphazene, phenoxyphosphazene, methylphenoxyphosphazene, aminophosphazene and fluoroalkylphosphazene.

Preferred is phenoxyphosphazene.

The phosphazenes may be used alone or as mixtures. The radical R can always be identical or 2 or more radicals in formulae (Ia) and (Ib) may be different.

Phosphazenes and their preparation are described, for example, in EP-A 728 811, DE-A 1 961 668 and WO 97/40092.

The flame retardants may be used alone or in any desired mixture with one another or in mixtures with other flame retardants.

Phosphorus/oxygen compounds and phosphorus/sulfur compounds in accordance with component D.2 are preferably phosphorus oxides and phosphorus sulfides. Particularly preferred is $P_2O_5$. Aluminium phosphates, alkaline-earth phosphates, alkali phosphates or ammonium phosphates are also suitable.

The phosphorus-containing flame retardant in accordance with component D.1 and the phosphorus compounds in accordance with component D.2 may be added in the preparation of the polymer blend separately or mixed as a special formulation. Components D.1 and D.2 can be mixed at room temperature or at elevated temperature. Preferably, these blends are prepared at temperatures above 100° C., particularly preferably above 200° C. In the context according to the invention, those products are also to be understood that are obtained at higher temperatures from component D.1 and component D.2.

Component E

The fluorinated polyolefins E have fluorine contents preferably of 65 to 76, in particular of 70 to 76 wt %, and mean particle diameters $d_{50}$ of 0.05 to 1000, preferably 0,08 to 20 μm. In general, the fluorinated polyolefins F have a density of 1,2 to 2,3 g/cm³. Preferred fluorinated polyolefins F are polytetrafluoroethylene, polyvinylidine fluoride and tetrafluoroethylene/hexafluoropropylene and ethylene-tetrafluoroethylene copolymers. The fluorinated polyolefins are known (cf. "Vinyl and Related Polymers" by Schildknecht, John Wiley & Sons, Inc., New York, 1962, pages 484–494; "Fluoropolymers" by Wall, Wiley Interscience, John Wiley & Sons, Inc., New York, Volume 13, 1970, pages 623–654; "Modern Plastics Encyclopedia", 1970–1971, Volume 47, No.10 A, October 1970, McGraw-Hill, Inc., New York, pages 134 and 774; "Modern Plastics Encyclopedia", 1975–1976, October 1975, Volume 52, No. 10 A, McGraw-Hill, Inc., New York, pages 27, 28 and 472, and U.S. Pat. Nos. 3,671,487, 3,723,373 and 3,838,092).

They can be prepared by known methods, for example by polymerizing tetrafluoroethylene in an aqueous medium using a catalyst that forms free radicals, for example, sodium peroxydisulfate, potassium peroxydisulfate or ammonium peroxydisulfate at pressures of 7 to 71 kg/cm$^2$ and at temperatures of 0 to 200° C., preferably at temperatures of 20 to 10° C. (see, for example, U.S. Pat. No. 2,393,967 for further details). Depending on the form in which it is used, the density of these materials may be between 1.2 and 2.3 g/cm$^3$ and the mean particle size between 0.5 and 1000 μm.

According to the invention, preferred fluorinated polyolefins E are tetrafluoroethylene polymers having a mean particle diameter of 0.05 to 20 μm, preferably 0.08 to 10 μm, and a density of 1.2 to 1.9 g/cm$^3$, and are preferably used in the form of a coagulated mixture of emulsions of the tetrafluoroethylene polymers F with emulsions of the graft polymers B.

Further preferred formulations according to the invention are the fluorinated polyolefins E:

E.1) as a coagulated mixture containing at least one of the components A to C, the fluorinated polyolefine E or polyolefin blend being mixed as an emulsion with at least one emulsion of the components A to C and then coagulated, E.2) as a precompound with at least one of the components A to C, the fluorinated polyolefins E being mixed as powders with a powder or a granular material of at least one of the components A to C and compounded in the melt, in general at temperatures from 208° C. to 330° C. in the standard equipment, such as internal mixers, extruders or twin screws.

Preferred formulations for the fluorinated polyolefins E are coagulated mixtures containing a graft polymer B or a vinyl (co)polymer C. Suitable fluorinated polyolefins E that can be used in powdered form are tetrafluoroethylene polymers having a mean particle diameter of 100 to 1000 μm and a density of 2.0 g/cm$^3$ to 2.3 g/cm$^3$.

To prepare a coagulated mixture of B and F, an aqueous emulsion (latex) of a graft polymer B is first mixed with a finely divided emulsion of a tetrafluoroethylene polymer F; suitable tetrafluoroethylene polymer emulsions usually have a solids content of 30 to 70 wt %, in particular of 50 to 60 wt %, preferably of 30 to 35 wt %.

The amounts specified in the description of component B may include the proportion of graft polymer for the coagulated blend of graft polymer and fluorinated polyolefins.

In the emulsion mixture, the weight ratio of graft polymer B to tetrafluoroethylene polymer F is 95:5 to 60:40. The emulsion blend is then coagulated in a known manner, for example by spray drying, freeze drying or coagulation by adding inorganic or organic salts, acids, bases or organic water-miscible solvents, such as alcohols and ketones, preferably at temperatures of 20 to 150° C., in particular of 50 to 100° C. If necessary, drying can be carried out at 50 to 200° C., preferably 70 to 100° C.

Suitable tetrafluoroethylene polymer emulsions are commercially available products and are offered for sale, for example, by DuPont as Teflon® 30 N.

The molding compositions according to the invention may contain at least one of the standard additives, such as lubricants and mould release agents, nucleating agents, antistatic agents, stabilizers and also dyes and pigments.

The blends according to the invention containing the components A to E and, optionally, further known additives, such as stabilizers, dyes, pigments, lubricants and mould release agents, nucleating agents and also antistatic agents, are prepared by mixing the respective constituents in a known manner and melt-compounding and melt-extruding them at temperatures of 200° C. to 300° C. in standard equipment such as internal mixers, extruders and twin-shaft screws, the component F preferably being used in the form of the coagulated mixture already mentioned.

The individual constituents may be mixed in a known manner either in steps or simultaneously and, specifically, either at about 20° C. (room temperature) or at higher temperature.

The invention therefore relates also to a method of preparing the moulding compositions.

Owing to their excellent flame resistance and stress behaviour and their good mechanical properties, the blends according to the invention are suitable for producing mouldings of any type, in particular those having enhanced requirements relating to stress cracking behaviour as, for instance, in the case of contact with oils, greases or organic solvents.

The blends of the present invention may be used to produce mouldings of any type. In particular, mouldings can be produced by injection-moulding. Examples of producible mouldings are: casing parts of any type, for example for domestic appliances, such as fruit pressers, coffee machines and mixers, for office machines, such as monitors, printers and copiers, covers for the building sector and parts for the motor vehicle sector. In addition, they may be used in the field of electrical engineering because they have very good electrical properties.

Furthermore, the molding compositions according to the invention may be used, for example, to produce the following mouldings or moulded parts:

Internal finishing parts for rail-borne vehicles, hub caps, casings of electrical appliances containing small transformers, casings for information-processing and information-transmitting appliances, casings and lining for medical purposes, massaging appliances and casings therefor, toy vehicles for children, two-dimensional wall components, casings for safety devices, rear spoilers, thermally insulated transportation containers, devices for keeping or casing for small animals, moulded parts for sanitary and bathroom fittings, cover gratings for ventilation openings, and moulded parts for garden and appliance sheds, and casings for garden appliances.

Further applications are possible as appliances for file technology: telecommunication appliances, such as telephone sets and telefax machines, computers, printers, scanners, plotters, monitors, keyboards, typewriters, dictating machines, etc, as electrical appliances: mains units, chargers, small transformers for computers and entertainment electronics, low-voltage transformers, etc., as garden appliances: garden furniture, mowing-machine casings, pipes and casings for garden irrigation, garden sheds, leaf collectors, shredders, chaff cutters, spraying appliances, etc., in the furniture field: worktops, furniture laminates, shutter components, office furniture, tables, chairs, armchairs, cupboards, shelves, door components, window components, linen drawers, etc., as sport appliances and toys: toy vehicles, seat surfaces, pedals, sports equipment, bicycles, table-tennis tables, home trainers, golf caddies, snowboards, outside parts of boats, camping products, beach chairs, etc., in the indoor and outdoor building sector: house cladding, profiled strips, pipes, cables, shutter components, letterboxes, lamp casings, roof tiles, slabs, partitions, cable ducts, skirting boards, plug sockets, etc., in the field of motor vehicles/rail-borne vehicles: wall and roof claddings, seat shells, seats, benches, tables, luggage racks, hub caps, rear spoilers, mudguards, tailgates, engine bonnets, side parts, etc.

A further type of processing is the production of mouldings by thermoforming from prefabricated slabs or films.

The present invention therefore relates, furthermore, also to the use of the moulding compositions according to the invention for producing mouldings of any type, preferably of the abovementioned types, and also to the mouldings composed of the moulding compositions according to the invention.

EXAMPLES

Component A

Linear polycarbonate based on bisphenol A having a relative solution viscosity of 1.252, measured in $CH_2Cl_2$ as solvent at 25° C. and at a concentration of 0.5 g/100 ml.

Component B

Graft polymer of 40 parts by weight of a copolymer of styrene and acrylonitrile in a ratio of 72:28 to 60 parts by weight of particulate, crosslinked polybutadiene rubber (mean particle diameter $d_{50}$=0.40 μm), prepared by emulsion polymerization.

Component C

Styrene/acrylonitrile copolymer having a styrene/acrylonitrile weight ratio of 72:28 and an inherent viscosity of 0.55 dl/g (measured in dimethylformamide at 20° C.).

Component D

D.1.1 Triphenylphosphate, disflamoll TP® supplied by Bayer AG Leverkusen, Germany.

D.1.2 m-Phenylene bis(di-phenyl phosphate), Fyrolflex® supplied by AKZO, Nobel Chemicals GmbH, 52349 Düren, Germany.

D.2 Commercially available $P_2O_5$, supplied by Riedel-de Haen, Germany.

Da) Mixture of D1.1 and D.2

Preparation:

The triphenyl phosphate is melted under nitrogen at 60° C. Then the phosphorus pentoxide is added. The mixture is stirred vigorously for 10 min, heated to 270° C. and kept at this temperature for 120 minutes. After the reaction, the product is cooled, in which process needle-shaped crystals are produced.

The triphenyl phosphate: $P_2O_5$ ratio in Da) is 90:10.

Db) Preparation as for Da), but only 30 min at 270° C.

The triphenyl phosphate: $P_2O_5$ ratio in Db) is 75:25. Db) is a viscous liquid.

Component E

Tetrafluoroethylene polymer as a coagulated mixture of a SAN graft polymer emulsion in accordance with component B in water and a tetrafluoroethylene polymer emulsion in water. The weight ratio of graft polymer B to tetrafluoroethylene polymer E in the mixture is 90 wt % to 10wt %. The tetrafluoroethylene polymer emulsion has a solids content of 60wt % and the mean particle diameter is between 0.05 and 0.5 μm. The graft polymer emulsion has a solids content of 34 wt % and a mean latex particle diameter of 0.4 μm.

Preparation of E

The emulsion of tetrafluoroethylene polymer (Teflon 30 N supplied by DuPont) is mixed with the emulsion of graft polymer B and stabilised with 1.8 wt %, relative to the polymer solid, of phenolic antioxidants. The mixture is coagulated at 85 to 95° C. with an aqueous solution of $MgSO_4$ (Epsom salts) and acetic acid at a pH of 4 to 5, filtered and washed until practically electrolyte free, then freed of most of the water by centrifugation and then dried at 100° C. to form a powder. Said powder can then be compounded with the further components in the equipment described.

Preparation and Testing of the Moulding Compositions According to the Invention

The components are mixed in a 3 l internal mixer. The mouldings are produced in a type Arburg 270 E injection-moulding machine at 260° C.

The Vicat B heat resistance is determined in accordance with DIN 53 460 (ISO 306) on rods measuring 80×10×4 mm.

The stress cracking behaviour (ESC behaviour) is investigated on rods measuring 80×10×4 mm (produced at a processing temperature of 260° C.). A mixture of 60 vol. % of toluene and 40 vol. % of isopropanol is used as test medium. The specimens are pre-stretched by means of a circular-arc template (pre-stretching as a percentage) and stored at room temperature in the test medium,. The stress cracking behaviour is assessed from the crack formation or rupture as a function of the pre-stretching ε) and the exposure time in the test medium.

The fire behavior of the samples was measured according to UL-Subj. 94 V on rods measuring 127×12.7×1.6 mm produced on an injection moulding machine at 260° C.

The UL 94 V-O classification comprises the properties, described below, of materials that are tested in accordance with the UL 94 V instructions.

The molding compositions in this class do not contain any samples that burn for longer than 10 s whenever they are acted on by the residual flame; they do not have a total burning time of more than 50 s when each set of samples is acted upon by a flame for the second time; they do not contain any samples that burn off completely up to the holding clamp fixed to the upper end of the sample; they do not comprise any samples that ignite the cottonwool disposed beneath the sample as a result of burning drops or particles; they also do not contain any samples that glow for longer than 30 s after removing the test flame.

Other UL 94 classifications designate samples that are less flame-resistant or less self-extinguishing because they give off flaming drops or particles. These classifications are designated as UL 94 V-1 and V-2. "N.B." means "failed" and is the classification of samples that have a burn time of ≧30 s.

TABLE

Moulding compositions and their properties

| Components [parts by Wt] | 1 (Comparison) | 2 | 3 | 4 | 5 | 6 (Comparison) | 7 | 8 |
|---|---|---|---|---|---|---|---|---|
| A | 68.4 | 68.4 | 68.4 | 68.4 | 68.4 | 83.0 | 83.0 | 83.0 |
| B | 6.8 | 6.8 | 6.8 | 6.8 | 6.8 | 4.0 | 4.0 | 4.0 |
| C | 9.3 | 9.3 | 9.3 | 9.3 | 9.3 | 1.1 | 2.2 | 2.2 |
| D.1.1 | 8.1 | 8.1 | 8.1 | 8.1 | 8.1 | — | — | — |
| D.1.2 | 2.7 | 2.7 | 2.7 | 2.7 | 2.7 | 6.6 | — | — |
| D2 | — | 0.25 | 0.5 | 0.75 | 1.0 | — | | |
| Da | | | | | | | 6.6 | |
| Db | | | | | | | | 6.6 |
| E | 4.2 | 4.2 | 4.2 | 4.2 | 4.2 | 3.6 | 3.6 | 3.6 |
| Mould release agent | 0.4 | 0.4 | 0.4 | 0.4 | 0.4 | 0.4 | 0.4 | 0.4 |
| Properties | | | | | | | | |
| Vicat B120 (° C.) | 97 | 97 | 97 | 97 | 97 | 108 | 109 | 116 |
| Total burning time UL 94 V 1.6 mm (sec) | 32 | 25 | 22 | 19 | 11 | 65 | 36 | 60 |
| ESC behaviour | | | | | | | | |
| Rupture, $\epsilon_x$ in (%) | 2.0% | 2.0% | 2.0% | 2.0% | 2.4% | 0.8% | 1.0% | 1.4% |
| Time (min) | 2:24 | 3:37 | 5:00 | 5:00 | 5:00 | 5:00 | 5:00 | 5:00 |

In the experimental series 1 to 5, it becomes clear that, if $P_2O_5$ is used, moulding compositions are obtained that have substantially shorter burning times and markedly better stress cracking behaviour (rupture at greater pre-stretching or for longer exposure times). In experiments 7 and 8, $P_2O_5$ and triphenyl phosphate were used at elevated temperatures to prepare a special formulation that proves to be a very effective flame retardant. The molding compound in experiment 7 has a triphenyl phosphate content reduced by 10% and, nevertheless, has a burning time shortened from 65 to 36 seconds, with advantages in heat resistance and stress cracking behaviour.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) aromatic polycarbonate and/or polyester carbonate,
   B) impact modifier
   C) optionally, thermoplastic homopolymer and/or copolymer,
   D) a combination of
      D.1 organic phosphorus compound and
      D.2 at least one compound different from D.1 selected from the group consisting of phosphorus oxide and phosphorus sulfide.

2. The composition of claim 1 wherein D is present in an amount of 0.1 to 30 parts by weight.

3. The composition of claim 1 wherein D.2 is a phosphorous oxide.

4. The composition of claim 1, wherein D.1 is at least one monomeric or oligomeric member selected from the group consisting of phosphoric acid ester, phosphonic acid ester, phosphonate amine and phosphazene.

5. The composition of claim 1 wherein D.1 conforms to the general formula (III)

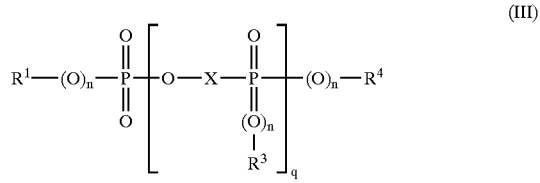

(III)

where

R$^1$, R$^2$, R$^3$ and R$^4$ independently of one another denote an optionally halogenated $C_1$- to $C_8$-alkyl, or an optionally substituted by alkyl, and/or halogen $C_5$- to $C_6$-cycloalkyl, $C_6$- to $C_{20}$-aryl or $C_7$- to $C_{12}$-arylalkyl, n is, independently of one another, 0 or 1, q is 0 to 30 and X is a mononuclear or polynuclear aromatic radical containing 6 to 30 carbon atoms, or a linear or branched aliphatic radical containing 2 to 30 carbon atoms, optionally OH-substituted and contain up to 8 ether bonds.

6. The composition of claim 5, wherein X in formula (III) stands for

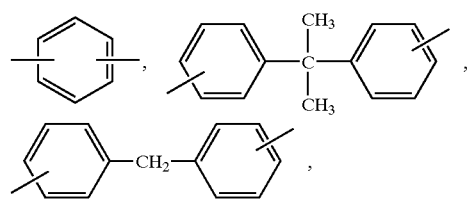

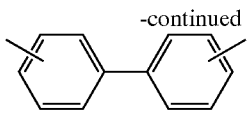

or their chlorinated or brominated derivatives.

7. The composition of claim 5 wherein component D.1 is at least one member selected from the group consisting of monophosphate, and oligophosphate.

8. The composition of claim 1 wherein D.1 is at least one member selected from among phosphonate amine conforming to formula (IV)

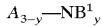 (IV)

in which

A stands for a radical of formula (Va)

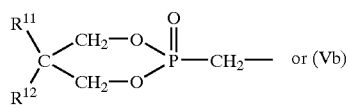 or (Vb)

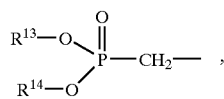

$R^{11}$ and $R^{12}$ stand, independently of one another, for unsubstituted or substituted $C_1$–$C_{10}$-alkyl or for unsubstituted or substituted $C_6$–$C_{10}$-aryl, $R^{13}$ and $R^{14}$ stand, independently of one another, for unsubstituted or substituted $C_1$–$C_{10}$-alkyl or unsubstituted or substituted $C_6$–$C_{10}$aryl or $R^{13}$ and $R^{14}$ together denote an unsubstituted or substituted heterocyclic ring of 3 to 10 carbon atoms, and y is 0, 1 or 2 and $B^1$ stands independently for hydrogen, optionally halogenated $C_2$–$C_8$-alkyl, unsubstituted or substituted $C_6$–$C_{10}$-aryl a phosphazene conforming to formulae (VIa) and (VIb)

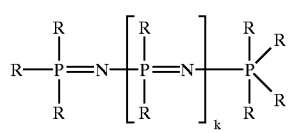 (VIa)

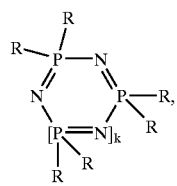 (VIb)

wherein

R is in each case identical or different and stands for amino, in each case optionally halogenated, $C_1$- to $C_8$-alkyl or $C_1$- to $C_8$-alkoxy, in each case optionally substituted by alkyl, $C_4$-alkyl, and/or halogen-substituted $C_5$- to $C_6$-cycloalkyl, $C_6$- to $C_{20}$-aryl, $C_6$- to $C_{20}$-aryloxy, or $C_7$–$C_{12}$-aralkyl, k is an integer of 0 to 15.

9. The composition of claim 1 wherein phosphorus oxide is phosphorous pentoxide.

10. The composition of claim 1 further containing an anti-dripping agent.

11. The composition of claim 1 wherein impact modifier is a graft polymer of B.1 5 to 95 wt % of at least one vinyl monomer on B.2 95 to 5 wt % of one or more graft bases having glass-transition temperatures lower than 10° C.

12. The composition of claim 11 wherein B.1 contains

B.1.1. 50 to 99 parts by weight of at least one member selected from the group consisting of vinyl aromatic, nucleus-substituted vinyl aromatics and $C_1$–$C_4$-alkyl methacrylates, and B.1.2 1 to 50 parts by weight of at least one member selected from the group consisting of vinyl cyanide, $C_1$–$C_8$-alkyl methacrylate and a derivative of unsaturated carboxylic acid.

13. The composition of claim 12 wherein B1.1 is at least one member selected from the group consisting of styrene, α-methylstyrene and methyl methacrylate and wherein B.1.2 is at least one member selected from the group consisting of acrylonitrile, maleic anhydride and methyl methacrylate.

14. The composition of claim 13 wherein B.1.1 is styrene and B.1.2 is acrylonitrile.

15. The composition of claim 11, wherein the graft base B.2 is at least one member selected from the group consisting of diene rubber, EP(D)M rubber, acrylate rubber, polyurethane rubber, silicon rubber, chloroprene rubber and ethylene/vinyl acetate rubber.

16. The composition of claim 15, wherein diene rubber is a copolymer of diene.

17. The composition of claims 1 wherein said C is at least one member selected from the group consisting of thermoplastic vinyl (co)polymer and polyalkylene terephthalate.

18. The composition of claim 10 wherein the anti-dripping agent is fluorinated polyolefin.

19. A thermoplastic molding composition comprising

A) 40 to 99 parts by weight of aromatic polycarbonate and/or polyester carbonate, B) 0.5 to 60 parts by weight of a graft polymer of B.1) 5 to 95 wt. % relative to the weight of B of one or more vinyl monomers on B.2) 95 to 5 wt. % relative to the weight of B of one or more graft bases having a glass-transition temperature lower than 10° C., C) 0 to 45 parts by weight of at least one thermoplastic polymer selected from the group consisting of vinyl (co)polymer and polyalkylene terephthalate, D) 0.1 to 30 parts by weight of a combination of D.1) organic phosphorus compound and D.2) at least one compound different from D.1 selected from the group consisting of phosphorus oxide and phosphorus sulfide, E) 0 to 5 parts by weight of an anti-dripping agent, wherein the sum of the parts by weight of the components A–E is 100.

20. A method of using the composition of claim 1 comprising producing molded articles.

21. A molded article comprising the composition of claim 1.

* * * * *